United States Patent [19]
Cain et al.

[11] Patent Number: 5,879,735
[45] Date of Patent: *Mar. 9, 1999

[54] FAT BLENDS, BASED ON DIGLYCERIDES

[75] Inventors: Frederick William Cain, Voorburg, Netherlands; Stephen Raymond Moore, Thrapston, Great Britain; Anne Cynthia Peilow, Wollaston, Great Britain; Paul Thomas Quinlan, Bedford, Great Britain

[73] Assignee: Loders-Croklaan B.V., Wormerveer, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 687,612

[22] PCT Filed: Feb. 2, 1995

[86] PCT No.: PCT/EP95/00385

§ 371 Date: Aug. 8, 1996

§ 102(e) Date: Aug. 8, 1996

[87] PCT Pub. No.: WO95/22256

PCT Pub. Date: Aug. 24, 1995

[30] Foreign Application Priority Data

Feb. 18, 1994 [EP] European Pat. Off. .............. 94301161
Mar. 11, 1994 [EP] European Pat. Off. .............. 94301734

[51] Int. Cl.⁶ ..................................................... A23D 7/00

[52] U.S. Cl. ............................................. 426/603; 426/607
[58] Field of Search ..................................... 426/601, 607, 426/608, 603

[56] References Cited

FOREIGN PATENT DOCUMENTS

| 0 171 112 | 2/1986 | European Pat. Off. . |
| 0 378 893 | 7/1990 | European Pat. Off. . |
| 0 402 090 | 12/1990 | European Pat. Off. . |
| 0 417 562 | 3/1991 | European Pat. Off. . |
| 0 425 958 | 5/1991 | European Pat. Off. . |
| 91/08677 | 6/1991 | WIPO . |

OTHER PUBLICATIONS

Lowe 1937 Experimental Cookery John Wiley & Sons London 2nd edition pp. 266–273.

Guamstone 1983 Lepids in Foods Chemistry Bio Chemistry & Technology Per gamon Press New York p. 152–154.

*Primary Examiner*—Carolyn Paden
*Attorney, Agent, or Firm*—Pillsbury Madison & Sutro LLP

[57] ABSTRACT

Fat blends, suitable for food application, in particular for wrapper- or tubspreads, comprise: 30–70 of diglycerides, 70–30 of triglycerides wherein the diglycerides comprise: 25–70% SU, 10–70% UU, less than 30% of SS (S=saturated fatty acid $C_{12}$–$C_{24}$; U=unsaturated fatty acid$\geq C_{16}$) and wherein the triglycerides contain 1–70 wt. % of $S_2$U-triglycerides, while the SAFA-content of the blend is less than 50 wt. %.

14 Claims, No Drawings

FAT BLENDS, BASED ON DIGLYCERIDES

This application claims benefit of international application PCT/EP95/00385, filed Feb. 2, 1995.

BACKGROUND OF THE INVENTION

In the prior art many fatblends have been disclosed, that are suitable for fat-continuous emulsions, as can be found in shortenings, margarines and spreads. In order to be applicable in these applications the fats must fulfil a number of criteria, such as they must have a critical plastic consistency, both at refrigeration and at ambient temperature they must be melting readily and completely in the mouth and nowadays also: they preferably should be healthy.

In order to meet the above requirements the fats must have a specific N-profile (solid fat index at different temperatures), while the fats also must have a specific fatty acid composition (i.e.: its FAME).

Solutions for the above problem were found for fats based substantially on triglycerides. In those fats a structuring compound of the trisaturated type (i.e.: $S_3$, S=saturated fatty acid) must be present.

However, the presence of these triglycerides $S_3$ is not very beneficial for its healthy character, because it will cause a relatively high level of saturated fatty acids in the fats, which saturated acids are believed to be responsible for heart- and vascular diseases. Therefore, a solution was sought in another direction. In WO 91/08677 a margarine oil is disclosed that is low in trans fatty acids and low in intermediate chain saturated fatty acids (including $C_{16:0}$) and wherein as a structuring fat 5–15 wt % of fatty acid diglycerides are present. So, the above fats comprise:

84–95 wt % triglycerides

5–15 wt % diglycerides

<3 wt % trans-acids

<6 wt % intermediate chain fatty acids

25–45 wt % $C_{18:2}$

0–11 wt % $C_{18:3}$

5–25 wt % $C_{18:1}$ while the fatty acid residues are non-random distributed, and the fatblend displays a solid fat profile of:

$N_{10}$=7–31

$N_{21}$=3–25

$N_{27}$=0.7–10

$N_{33}$=0.5–4

$N_{39}$<3

From the above composition it can be calculated that the fats have a theoretically minimum SAFA-content of 37 wt %. Moreover, the requirement for the non-random distribution causes, that the fats can only be obtained along an enzymic route using directing (1.3-specific) enzymes. The diglyceride-content is obtained by adjusting the water content during the enzymic conversion to levels that produce the required amount of 5–15 wt % of diglycerides. Therefore, the above document does not provide a solution for fats with SAFA-contents below 37 wt %, wherein the fatty acids do not need to be present in a non-randomized way and that can contain higher amounts of diglycerides.

From EP 417 562 fat continuous emulsions are known, having an oil phase and a waterphase in a weight ratio of 99:1 to 1:95. The oil phase comprises a diglyceride mixture, which is not specified. According to reference-example 2 the diglyceride mixture can be obtained by a conversion of glycerine with rapeseed oil in the presence of a base. The product obtained contained 19,4% triglyceride and 79,6 wt % diglyceride. This mixture was blended with refined rapeseed oil. Similar oil products could be obtained by starting from palmoil and lard. In order to be able to make fat-continuous emulsions from these mixtures a phospholipid— mixture, comprising N-free phospholipid and N-containing phospholipid had to be used in a weight-ratio of at least 1,0. Nothing is disclosed about the role of the diglycerides, nor about its composition.

EP 378 893 discloses oil/fat-compositions, comprising a diglyceride-containing glyceride mixture and a phospholipid with a specific composition. The fats are resistant against oxidation and can be used as cooking, deep-frying, pan-frying, roasting or baking fat. The oil can contain 5–100% of diglycerides. The fatty acid residues can have a chain length of 8–24 C-atoms, while the content of unsaturated fatty acid residues is up to 70 wt %. The content of SU-diglycerides is up to 40%, the content of SS-diglycerides is up to 5%; the rest being UU-diglycerides. In fact this document discloses two type of compositions, i.e. one type that combines (in the diglyceride-part) less than 40% SU with less than 5% SS and another type, that combines at least 40% SU with at least 5% SS. Nothing is disclosed about fats, having simultaneously at least 40% SU and maximum 5% SS in its diglyceride-part or about fats, having less than 40 wt % SU and simultaneously more than 5 wt % SS in its diglyceride part. Moreover nothing can be found about the use of above fats in tub- or wrapper margarines or halvarines. We found fat-compositions that are specifically adapted for use in tub, respectively in wrapper-margarines or halvarines. In order to be able to emulsify our fats, we found it was not necessary to apply the very specific phospholipid-compositions, prescribed by EP 378 893. Very good products can be obtained by using our fats and other emulsifiers, such as lecithin (ordinary) or monoglycerides (Hymono's).

In EP 425 958 oil-in-water-in oil emulsions are obtained having on total fat 10–100% of a diglyceride with a melting point below 20° C.

In EP 171 112 edible fat compositions are disclosed that contain 5–30 wt % diglycerides. In the mixtures specific ratios between diglycerides and monoglycerides must be fulfilled, while the level of saturated fatty acids with 16–22 C-atoms in the diglycerides is kept below 45 wt %. According to the specification do the diglycerides have a profound influence on the crystallisation behaviour of fats and have a beneficial effect on the spreadability of hard fats. The diglycerides, therefore, are not used in order to achieve a structuring of the fats; for that purpose, quite a high amount of hardened fats are present in the fat blends (according to all examples). As a result of the above the SAFA-levels of the total fat blend is still quite high.

SUMMARY OF THE INVENTION

We found novel fat compositions, wherein the level of diglycerides is rather high. Therefore, the diglycerides in our blends do act as structuring fat, taking over this function from part of the conventional triglyceride components. These higher levels of a specific diglyceride mixture enables us to prepare fat blends with lower SAFA levels, while we also found that the other properties of the fat blends remained good. In particular we found novel fats, that when used in spreads can combine low SAFA-levels with high hardness (expressed as C in g.cm$^{-2}$) at lower temperatures (about 5° C.), while the spreadability of the spreads at ambient temperature is good and the products have good oral properties. Above can be expressed by the equation:

$$\frac{C_5}{N_5 \times SAFA} > 3$$

$C_5$ being the hardness at 5° C.; $N_5$ being the solid fat content (NMR-pulse not stab.) at 5° C.; SAFA being the SAFA-content of the fat.

Moreover, we found that our diglycerides resulted in fat blends that displayed higher crystallisation rates, than known blends.

We found fat blends, suitable for food application, in particular tub- or wrapper margarines of halvarines, comprising:

30–70 wt % of diglycerides, and
70–30 wt % of triglycerides,
which diglycerides are composed of:
25–70 wt % SU-diglycerides;
10–70 wt % UU-diglycerides;
less than 30 wt % SS-diglycerides; preferably<20 wt %.
(S=saturated fatty acid $C_{12}$–$C_{24}$; U=unsaturated fatty acid with at least 16 C-atoms);
while the triglycerides contain 1–70 wt % of $S_2U$-triglycerides; preferably 2–30 wt % $S_2U$.
the content of saturated fatty acids for the whole blend being less than 50 wt %; preferably less than 40 wt %, most preferably less than 35 wt %.

The above fat blends have as an additional advantage that they are fast crystallising. Moreover, the warm-useage (baking or frying) of our low SAFA-product is at least comparable with the performance of standard high SAFA- or high trans fats.

Preferred blends either combine in the diglyceride-component more than 40 wt % SU, with SS-contents of less than 5 wt %, or SU-contents of less than 40 wt % with SS-contents of more than 5 wt %. The former blends will display an SU/SS-ratio of >8, the latter will display an SU/SS-ratio <8.

The above blends can be free of trans acids and free of chemically interesterified fats. However, blends that contain chemically interesterified fat-component can also be applied (either per se or in combination with non-chemically interesterified fats).

Our novel blends can contain some monoglycerides (up to 15 wt %), however, the best results are obtained when less than 10 wt %, preferably less than 5 wt % and most preferably less than 2 wt % monoglycerides are present.

DETAILED DESCRIPTION OF THE INVENTION

Although the triglyceride-component of our blends can be selected from a broad range of triglycerides, provided that the total composition meet our SAFA-requirement (<50%), we prefer to use liquid oils (i.e.: high in: $C_{18:1}$; $C_{18:2}$ and/or $C_{18:3}$) as our triglyceride-source. Those oils are suitably selected from the group consisting of sunflower oil, soybean oil, maize oil, olive oil, high oleic sunflower oil, high oleic safflower oil and olein fractions of vegetable oils. It is, however, also possible to use liquid oils obtained by enzymic conversion, or olein-fractions obtainable by fractionation (wet- or dry) of enzymically made oils. The amount of liquid oil, preferably is 20–60 wt % of the triglyceride-component of our blend. The enzymic conversions can be performed using the technology disclosed in our GB 1,577, 953. The starting materials should be selected such, that the desired fats or oils are obtained. It is of course also possible to use liquid oils, that are made according to chemical interesterification-processes (with or without a fractionation step).

The diglycerides that we apply preferably have a slip melting point of more than 20° C., in particular more than 25° C. (for the total diglyceride part) and are preferably derived from palmitic, stearic and oleic acid residues. The SU-component can contain simultaneously a saturated fatty acid residue S with 12–24 C-atoms and an unsaturated fatty acid residue with at least 16 C-atoms. The exact position of the residues S and U is not very important. Still we prefer the use of 1.3-diglycerides, because they result in better structuring-properties. So 1S-2U-diglycerides are about as suitable as 1S-3U diglycerides or as 1U-2S-diglycerides. However, we prefer to apply diglycerides of the SU-type that comprise at least 70 wt % of a diglyceride with one oleic and with one palmitic acid residue. Particularly suitable diglycerides have a melting point below 55° C. (for the pure diglyceride).

Depending on the end application we can select specific diglyceride compositions that make our fat blends most suitable for this particular use. E.g. fat blends high in solids, suitable for wrapper margarines will have a diglyceride composition according to:

40–70 wt % SU
10–60 wt % UU, preferably 10–40 wt %
<20 wt % SS, while the solid fat content (N-line; NMR pulse; not stabilised) of the total blend is at the temperature indicated:
$N_5>30$; $N_{35}<8$.

It is preferred that in these blends SU/SS is more than 8.

Fat blends most suitable for tub margarines, i.e. low solids fat blends will have the following diglyceride composition and properties:

25–45 wt % SU
40–70 wt % UU
<10 wt % SS while the solid fat content of the total blend (NMR-pulse, not stabilised) is at the temperature indicated:
$N_5<30$
$N_{35}<5$ and the SAFA content of the total blend is less than 30 wt %.

It is preferred, that in these blends SU/SS is less than 8.

The diglycerides that are applies in the blends can be obtained according to many methods, such as:

1. hydrolysis of triglycerides, this hydrolyses can be performed along a chemical route (using a base) or along an enzymic route.
2. esterification of glycerol. Again a chemical or an enzymic route can be applied.

A convenient enzymic route is disclosed in e.g. EP 307,154. In general the crude products obtained by those routes need to be purified by fractionation. Of course the different diglycerides can be used as a blend as well.

The glycerolysis is the most preferred route. In this route a vegetable fat is subjected to a conversion with glycerol. Depending on the amount of glycerol used (usually weight ratio of fat: glycerol=0.5–5) and the reaction conditions applied a mixture of (randomized) triglycerides, diglycerides and monoglycerides is formed. From this mixture the monoglycerides must be removed. The resulting low monoglyceride mixture can be subjected to a fractionation (=topping) in order to reduce its content of trisaturated triglycerides and its content of disaturated diglycerides. However, whether this topping must be carried out or not depends on the nature of the triglycerides applied for the glycerolysis, the conditions applied during the glycerolysis and the end application of the fat blend. However, typical processes are: for the preparation of a wrapper margarine:
(1) a glycerolysis of a vegetable fat, rich in $S_2U$-triglycerides, preferably in the presence of an enzyme, most preferably a 1,3-specific enzyme;
(2) removal of the monoglycerides formed from the crude reaction mixture of (1);
(3) fractionation of the product of (2) for the removal of SS-diglycerides and SSS-triglycerides
(4) adding liquid oil in such amounts that the fat blend with the composition according to claim 5 is obtained.

and for the preparation of a tub margarine:
(1) blending of a hardened vegetable oil and a liquid vegetable oil in a ratio of
    (15–35:85–65);
(2) subjecting the blend of (1) to glycerolysis, preferably with an enzyme, most preferably a 1,3-specific enzyme;
(3) removal of the monoglycerides formed from the crude reaction mixture (2);
(4) collecting the product of (3), having the composition according to claim 6, or;
(5) blending the product of (3) with a liquid oil in such a ratio that a product with the composition according to claim 6 is obtained.

In an embodiment of our invention, that is very advantageous our fat-blends display an N-profile, such that $(N_5-N_{20})<5.0$ this guarantees an excellent tub-fat, because its solid fat content at refrigerator temperature is about the same as at ambient temperature.

Tub-spreads and wrapper spreads can be made from our fatblends by using the conventional methods. Those spreads are fat-continuous and comprise 10–80 wt % of a fatblend with the particular composition of the fatblends according to the invention.

It should be understood that the N-values mentioned above are the values obtained by NMR-pulse on unstabilized fats (i.e.: after the following T-regime: melt at 80° C.; 90 min at 0° C.; 30 min. at measurement temperature).

EXAMPLES

1. Preparation of fatblend for a tub-margarine
1.1 A first diglyceride rich fat (=A) was prepared as follows:
palm-mid fraction, glycerol, lipolase 100 l enzyme (ex-NOVO Nordisk) and 0.01M phosphate buffer were mixed in weight ratio 100 palm-mid:20 glycerol:1 enzyme:1 buffer (resulting in pH=7.0).

The mixture was stirred at 35° C. for 24 hours.

Excess glycerol was decanted off. Monoglycerides and free fatty acids were removed in a falling film evaporator (260° C.; 0,3 mm Hg abs).

A product, containing 47,8% diglycerides and 2.1% monoglyceride was collected. This product was bleached and deodorised. The purified product was fractionated from hexane (1 oil:1,5 hexane by weight) at 30° C.

The olein-fraction was refractionated (3.2 hexane:1 oil) at –10° C. The olein fraction was collected (yield overall 48%). It contained 24,9% diglycerides.

This olein fraction was silica-treated with hexane/acetone 88/12 as solvent. A weight-ratio of 5:1:0,8 for solvent:fat:silica was applied. The product was washed with 2 parts of solvent:1 part of oil.

A diglycerideproduct (=A) was obtained, containing 24,3% wt % diglycerides and the rest triglyceride.
1.2 A second diglyceride-fat (=B) was prepared as follows:
Shea-stearin, high oleic sunflower oil, glycerol, lipolase 100 L-enzyme (ex-NOVO Nordisk) and 0,01M phosphate buffer (pH=7,0) were mixed in weight ratio=35:65:20:1:1. The mixture was stirred at 37° C. for 24 hours.

Excess glycerol was decanted off. Monoglycerides and free fatty acids were removed (260° C., 0,3 mm Hg, falling film evaporator).

The product was refined and the refined product was fractionated (1 weight parts oil:3 weight part hexane) at –12° C. The stearin fraction was collected (67% diglyceride: yield 21 wt %).

This stearin fraction was refractionated (3,08 hexane:1 oil) at 27° C. The olein fraction was collected. It contained 63,9% diglyceride. The overall yield was 19%.

This olein-fraction was subjected to a silica treatment with hexane/acetone (88:12) as solvent, applying a weight-ratio of 5 p.b.w. solvent:1 p.b.w. oil:1,5 p.b.w. silica. The product was washed with 2 p.b.w. solvent per 1 p.b.w. oil.

A diglyceride rich product (=B) was obtained, containing 67,4 wt % diglyceride and the rest triglyceride. The diglyceride consisted of: 11,9% SS; 46% SU and 42,1% UU.
1.3 A third diglyceride rich fat (=C) was prepared as follows:
High olein sunflower oil, glycerol, lipolase 100 L were mixed in weight ratio=100:20:0,5. The mixture was stirred for 24 hours at 40° C.

Excess glycerol, monoglycerides and free fatty acids were removed, as described above.

The product was refined and the refined product was fractionated at –12° C. (1 part by weight oil:2 parts by weight hexane). The olein fraction was collected.

It contained 16,9 wt % diglyceride, 0,8% monoglyceride and the rest triglyceride. The yield was 90 wt %. The diglyceride consisted of: 15,1% SU and 84,8% UU.
1.4 Fats A, B and C were blended in weight-ratio 13:27:60. The blend obtained, contained 30,9 diglycerides, 0,3 monoglyceride and rest triglycerides.

Its diglycerides were composed of: 7,8 wt % SS, 39,4 wt % SU and 52,8 wt % UU.

The blend contained:
7,8 wt % palmitic acid
11,6 wt % stearic acid
73,9 wt % oleic acid
3,5 wt % linoleic acid
traces of other acids.

Its SAFA-content was 22,5 wt %. The $N_5$=21,3 and $N_{35}$=2,5 (NMR-pulse, not stabilised).

The triglyceride part of the blend contained 9,2 wt % of $S_2U$-triglycerides.
2. Preparation of an 80% fat tub margarine A tub-margarine was made from the fat, obtained according example 1.4 (=fat blend of A, B and C). The following formulation was applied:

| Fatphase | wt % |
| --- | --- |
| Fat blend of ex 1.4 | 80 |
| Monoglycerides | 0,3 |
| Colorant | 0,01 |
| Flavour | 0,1 |
| Waterphase | wt % |
| Water | 18,3 |
| Skim milk powder | 0,5 |
| Gelatin (270 - bloom) | 0,5 |
| K-sorbate | 0,05 |
| Citric Acid | 0,02 |

The aqueous phase was made by heating the water to 80% and adding (slowly) the other ingredients, while mixing in a Silverson-mixer. The pH was adjusted to pH=5,1 by adding 20% lactic acid solution.

A water-in-oil premix was made at 50° C. by stirring (100 rpm) the fat phase in a premix tank and slowly adding the waterphase. After completion of the addition the mix was stirred for 5 minutes. Then it was pumped through a microvotator line, consisting of $A_1$, $C_1$, $A_2$, $C_2$-units.

The conditionings applied were as follows: Pump: proportioning pump set at 80% (40,3 g/min)

| Unit | $A_1$ | $C_1$ | $A_2$ | $C_2$ |
|---|---|---|---|---|
| Shaft speed rpm | 1000 | 1000 | 1000 | 1000 |
| Temperature °C. | 10 | 13 | 12 | 15 |

Exit temperatures were: 16,1°; 15,9°; 15,8° and 15,8° C. After the process had stabilised (=20 minutes) the product was collected, stored and evaluated. It was possible to collect products at any point after $C_1$. We collected products after $C_1$, and after $C_2$.

The following data (hardness C in g/cm$^2$ and conductivity in μS/cm) were found:

| Tub margarine | C at 5° C. | C at 20° C. | Conduct. 5° C. | Conduct. 20° C. |
|---|---|---|---|---|
| ex $C_1$ | 1510 | 125 | $10^{-5}$ | $10^{-5}$ |
| ex $C_2$ | 2000 | 140 | $10^{-5}$ | $10^{-5}$ |

All products were fat continuous and displayed good oral melt-down.

3. Preparation of fat blend for a wraper-margarine 3.1 A diglyceride rich fat (D) was made as follows:

Shea stearin was hydrolysed by stirring a mixture of 100 parts by weight of shea stearin, 4 parts by weight of a silica-water complex (50:50), 1 part by weight of lipolase 100 L at 40° C. for 4 hours.

The silica complex was filtered off. Monoglycerides and free fatty acids were removed by distillation (falling film evaporator; 260° C.; 0,3 mm Hg). Product D contained 10,8 wt % diglycerides; 0,3 wt % monoglyceride, rest: triglycerides.

The diglycerides were composed of: 6,6 wt % SS; 80,4 wt % SU; 13,1 wt % UU.

3.2 Another diglyceride-rich fat (=E) was prepared as follows:

High oleic sunflower oil, glycerol and lipolase 100 L were mixed in weight ratio 100:20:0,5. The mix was stirred at 40° C. for 24 hours. Excess glycerol, monoglycerides and free fatty acids were removed by decantation and evaporation. The purified product was refined and the refined product was fractionated at −12° C. (1 p.b.w. oil:2 p.b.w. hexane). The olein was collected. It contained 16,9 wt % diglycerides, 0,8 wt % monoglyceride, rest triglycerides.

The diglycerides consisted of: 15,1 wt % SU and 84,8 wt % UU.

3.3 Fats D and E were blended in weight-ratio 65:35.

The blend was subjected to a two-stage silica-treatment, by absorbing the diglycerides and monoglycerides onto silica, using hexane as solvent (2:1:1=hexane:oil:silica). The silica-complex was washed with hexane (2,1 p.b.w. hexane on 1 p.b.w. oil). The wash was discarded.

The silica-complex was washed with a mix of 88% hexane/12% acetone, using 2,1 p.b.w. mix:1 p.b.w. oil. The diglyceride-wash was collected.

The solvent was evaporated. The fat obtained (=fat F) contained 37,5% diglyceride.

3.4 The olein-fraction E of 3,2 was subjected to a two-stage silica-treatment, as described under 3.3.

However applying during the wash with hexane:2,6 p.b.w. hexane on 1 p.b.w. oil and applying for the wash with hexane/acetone 3,2 p.b.w. of the solvent-mix per 1 p.b.w. oil.

A fat G was obtained, containing 51,5 wt % of diglycerides.

3.5 Fats F and G were blended in a ratio of 85:15.

The blend contained: 43,5% diglyceride:rest triglyceride.

Its diglyceride-composition was: 4,7% SS; 40,2% SU; 55,1% UU.

The blend contained:

3,8 wt % palmitic 27,9 wt % stearic 62 wt % oleic 4,7 wt % linoleic traces of other fatty acids.

Its SAFA-level was 33,3%.

$N_5$=47,5; $N_{35}$=1,3 (NMR-pulse; not stab.).

Its triglyceride-part contained 50,4 wt % $S_2U$-triglycerides.

| a) Formulation | |
|---|---|
| Fat base | |
| Fat blend of ex 3.5 | 80% |
| Monoglycerides | 0,3% |
| Flavour | 0,1% |
| Colour (- carotene) | 0,01% |
| Aqueous phase (to pH 5.1) | |
| Water | 18,3% |
| Gelatin (270 bloom) | 0,5% |
| Skimmed Milk Powder | 0,5% |
| Potassium sorbate | 0,05% |
| Citric cid | 0,025% |
| All percentages on product basis. | | b) Processing 3 kg of product was produced on a votator line consisting of a premix-tank, pump, A-unit and C-unit.

Premix temperature was 50° C. with throughput of 42 g/min, A-unit and C-unit speed was set at 1000 r.p.m. Temperatures of the A- and C-units were 13° C. and 16° C. respectively.

The aqueous phase was prepared by heating the required amount of water to approximately 80° C. and then, using a Silverson mixer, slowly mixing in the ingredients. The pH of the system was adjusted to 5.1 by adding 20% lactic acid solution.

A water-in oil premix was prepared by stirring the fat phase in the premix tank and then slowly adding in the aqueous phase. When addition was complete, the mix was stirred for a further 5 minutes before pumping through the line. When the process had stabilised (around 20 minutes), product was collected for storage and evaluation.

Exit temperatures from the units were:

A 15,7° C.

C 16,6° C.

c. Evaluations

| Product | $C_5$ (g/cm$^2$) | Conduct. at 5° C. (μS/cm) |
|---|---|---|
| | 9970 | $10^{-5}$ |

All products were fat continuous with a good oral melt-down.

We claim:

1. Fat continuous emulsion comprising an aqueous phase in a continuous fat phase, said emulsion comprising 10–80 wt % of fat wherein the fat is a fat blend, suitable for food products, comprising:
   30–70 wt % of diglycerides functioning as a structuring fat, and
   70–30 wt % of triglycerides,
   which diglycerides are composed of:
   25–70 wt % SU-diglycerides;
   10–70 wt % UU-diglycerides;
   less than 30 wt % SS-diglycerides
   (S=saturated fatty acid $C_{12}$–$C_{24}$; U=unsaturated fatty acid with at least 16 C-atoms);
   while the triglycerides contain 1–70 wt % of $S_2U$-triglycerides;
   the total content of saturated fatty acids for the whole fat blend being less than 50 wt %, said fat blend being further characterized by its combination of low saturated fatty acid content and high hardness as expressed by the equation $$\frac{C_5}{N_5 \times SAFA} > 3$$

where C5 is the hardness of the fat blend at 5° C., $N_5$ is the solid fat content (NMR-pulse not stab.) at 5° C. and SAFA is the saturated fatty acid content of the fat blend.

2. Fat continuous emulsion according to claim 1, wherein the blend is free of trans unsaturated fatty acid residues and free of chemically interesterified fats.

3. Fat continuous emulsion according to claim 1, wherein the triglycerides at least partly are a liquid oil selected from the group consisting of sunflower oil, soybean oil, maize oil, olive oil, high oleic sunflower oil, high oleic safflower oil and olein fractions of vegetable oils.

4. Fat continuous emulsion according to claim 3 wherein the triglycerides comprise 20–60 wt % of the liquid oil.

5. Fat continuous emulsion according to claim 1, wherein the diglyceride part of the blend has a slip melting point of more than 20° C.

6. Fat continuous emulsion according to claim 1, wherein the diglycerides are derived from palmitic, stearic and oleic acid residues.

7. Fat continuous emulsion according to claim 1, suitable for wrapper margarines, wherein the diglycerides are composed of:
   40–70 wt % SU
   10–60 wt % UU,
   <20 wt % SS,
   while the solid fat content (N-line; NMR pulse; not stabilised) of the total blend is at the temperature indicated:
   $N_5>30$; $N_{35}<8$.

8. Wrapper margarine, comprising a fat-continuous emulsion with a fat content of 10–80 wt %, wherein the fat has the composition according to claim 7.

9. Fat continuous emulsion according to claim 1, suitable for tub-margarine, wherein the diglycerides are composed of:
   25–45 wt % SU
   40–70 wt % UU
   <10 wt % SS
   while the solid fat content of the total blend (NMR-pulse, not stabilised) is at the temperature indicated:

$N_3<30$
$N_{35}<5$
and the SAFA content of the total blend is less than 30 wt %.

10. Tub margarine, comprising a fat-continuous emulsion with a fat content of 10–80 wt %, wherein the fat has the composition according to claim 9.

11. Fat continuous emulsion according to claim 1, wherein the blend comprises less than 15 wt % monoglycerides.

12. A fat continuous emulsion according to claim 1 wherein the diglycerides are composed of 10–40 wt % UU and the diglyceride part of the blend has a slip melting point of more than 20° C. and the blend comprises less than 5 wt % monoglycerides.

13. A fat continuous emulsion, suitable for wrapper margarines, comprising water and a continuous fat phase, said fat phase comprising a fat continuous emulsion of:
   30–70 wt % of diglycerides, and
   70–30 wt % of triglycerides,
   which diglycerides are composed of:
   40–70 wt % SU-diglycerides;
   10'60 wt % UU-diglycerides;
   less than 20 wt % SS-diglycerides
   (S=saturated fatty acid $C_{12}$–$C_{24}$; U=unsaturated fatty acid with at least 16 C-atoms);
   while the solid fat content (N-line; NMR pulse; not stabilised) of the total blend is at the temperature indicated:
   $N_5>30$; $N_{35}<8$
   while the triglycerides contain 1–70 wt % of $S_2U$-triglycerides;
   the content of saturated fatty acids for the whole blend being less than 50 wt % and the fat continuous emulsion being further characterized by its combination of low saturated fatty acid content and high hardness as expressed by the equation $$\frac{C_5}{N_5 \times SAFA} > 3$$

where $C_5$ is the hardness of the fat continuous emulsion at 5° C., $N_5$ is the solid fat content (NMR-pulse not stab.) at 5° C. and SAFA is the saturated fatty acid content of the fat blend.

14. A fat continuous emulsion, suitable for tub margarine, comprising water and a continuous fat phase comprising a fat continuous emulsion of:
   30–70 wt % of diglycerides, and
   70–30 wt % of triglycerides,
   which diglycerides are composed of:
   25–45 wt % SU-diglycerides;
   40–70 wt % UU-diglycerides;
   less than 10 wt % SS-diglycerides
   (S=saturated fatty acid $C_{12}$–$C_{24}$; U=unsaturated fatty acid with at least 16 C-atoms);
   while the solid fat content of the total blend (NMR pulse; not stabilised) is at the temperature indicated:
   $N_5<30$
   $N_{35}<5$
   while the triglycerides contain 1–70 wt % of $S_2U$-triglycerides;
   the content of saturated fatty acids for the whole blend being less than 30 wt % and the fat continuous emulsion being further characterized by its combination of low saturated fatty acid content and high hardness as expressed by the equation $$\frac{C_5}{N_5 \times SAFA} > 3$$

where $C_5$ is the hardness of the fat continuous emulsion at 5° C., $N_5$ is the solid fat content (NMR-pulse not stab.) at 5° C. and SAFA is the saturated fatty acid content of the fat blend.

* * * * *